US008871399B2

(12) United States Patent
Franco et al.

(10) Patent No.: US 8,871,399 B2
(45) Date of Patent: Oct. 28, 2014

(54) METHOD AND DEVICE FOR LIMITING THE AGEING OF FUEL CELLS WITH PROTON EXCHANGE MEMBRANE

(75) Inventors: Alejandro Franco, Eybens (FR); Olivier Lemaire, Les Abrets (FR); Sylvie Escribano, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 716 days.

(21) Appl. No.: 12/867,203

(22) PCT Filed: Dec. 18, 2008

(86) PCT No.: PCT/FR2008/052356
§ 371 (c)(1),
(2), (4) Date: Nov. 18, 2010

(87) PCT Pub. No.: WO2009/101305
PCT Pub. Date: Aug. 20, 2009

(65) Prior Publication Data
US 2011/0059379 A1    Mar. 10, 2011

(30) Foreign Application Priority Data
Feb. 12, 2008    (FR) ..................... 08 50875

(51) Int. Cl.
*H01M 8/06* (2006.01)
*H01M 4/92* (2006.01)
*H01M 8/10* (2006.01)

(52) U.S. Cl.
CPC ............ *H01M 8/0662* (2013.01); *H01M 4/926* (2013.01); *H01M 2008/1095* (2013.01); *Y02E 60/50* (2013.01); *H01M 4/921* (2013.01)
USPC ......................................... 429/427

(58) Field of Classification Search
USPC ......................................... 429/427
See application file for complete search history.

(56) References Cited

U.S. PATENT DOCUMENTS

| 6,060,190 A * | 5/2000 | Campbell et al. ............. 429/483 |
| 6,309,769 B1 | 10/2001 | Haug |
| 2007/0292743 A1* | 12/2007 | Ball et al. ........................ 429/42 |
| 2008/0075985 A1* | 3/2008 | Gottmann ....................... 429/13 |

FOREIGN PATENT DOCUMENTS

| JP | 2006278190 | 10/2006 |
| WO | WO-2005045976 A1 | 5/2005 |
| WO | WO-2007108949 A1 | 9/2007 |

OTHER PUBLICATIONS

European Patent Office, International Search Report dated Jul. 20, 2009 (2 pgs. English Language).
Electrocatalyst Stability in PEMFCs and the Role of Fuel Starvation and Cell Reversal Tolerant Anodes, T.R. Ralph, et al., Department of Chemical and Biological Engineering, pp. 67-84.
Model of Carbon Corrosion in PEM Fuel Cells, Jeremy P. Meyers, et al., Journal of the Electrochemical Society, 2006, 153(8), pp. A1432-A1552.

(Continued)

*Primary Examiner* — Karie O'Neill Apicella
(74) *Attorney, Agent, or Firm* — Harris Beach PLLC

(57) ABSTRACT

The invention relates to a method for extending the lifetime of a PEMFC fuel cell that includes the step of supplying, at anode 3, a chemical compound capable of reacting with oxygen, but not originating from the fuel.

24 Claims, 5 Drawing Sheets

(56) References Cited

OTHER PUBLICATIONS

A Dynamic Mechanistic Model of an Electrochemical Interface, Alejandro A. Franco et al., Journal of the Electrochemical Society, 153(6), 2006, pp. A1053-A1061.

Development of a Method for Clarifying the Perfluorosulfonated Membrane Degradation Mechanism in a Fuel Cell Environment, Satoru Hommura et al., Journal of the Electrochemical Society, 155(1), 2008, A29-A33.

Membrane Degradation Mechanisms in PEMFCs, J. Electrochem, Soc., vol. 154, Issue 7, 2007, 2 pages.

Advanced Materials for Improved PEMFC Performance and Life, Dennis E. Curtin, Journal of Power Sources, May 2004, 2 pgs.

A Review of the Main Parameters Influencing Long-Term Performance and Durability of PEM Fuel Cells, Wolfgang Schmittinger, Journal of Power Sources, 2008, 1 pg.

Membrane Degradation Mechanism During Open-Circuit Voltage Hold Test, Nissan Research Center, Journal of Power Sources, 2008, 1 page.

* cited by examiner

METHOD AND DEVICE FOR LIMITING THE AGEING OF FUEL CELLS WITH PROTON EXCHANGE MEMBRANE

CROSS REFERENCE TO RELATED APPLICATIONS

This application is a National Stage filing under 35 U.S.C. §371 of PCT Application No. PCT/FR2008/052356, filed on Dec. 18, 2008. This application also claims the benefit of France Patent Application No. 0850875, filed Feb. 12, 2008. The entirety of both applications is incorporated hereby reference.

FIELD OF THE INVENTION

The present invention relates to the field of Proton Exchange Membrane Fuel Cells (PEMFCs).

It proposes a solution that makes it possible to limit their premature ageing, both due to corrosion of the catalytic carbon support which occurs on the cathode and deterioration of the proton conductive electrolyte material which is present in the membrane and in the active catalyst layer of such fuel cells.

BACKGROUND OF THE INVENTION

PEMCFs are current generators whose operating principle, illustrated in FIG. 1, is based on converting chemical energy into electric energy by means of a catalytic reaction between hydrogen and oxygen.

Membrane electrode assemblies or MEAs 1 (also referred to as fuel cell stacks) are the basic elements of PEMCFs. They consist of a polymer membrane 2 and catalyst layers 3, 4 on either side of the membrane which constitute the anode and cathode respectively. Membrane 2 is made using a proton conductive polymer such as Nafion® (Dupont de Nemours), Hyflon® (Solvay) or Dow® (Dow Chemical) (registered trademarks), which are fluorinated polymers.

Membrane 2 is therefore used to separate anode compartment 5 from cathode compartment 6. Catalyst layers 3, 4 generally consist of proton conductive polymers and platinum nanoparticles on carbon aggregate supports. Gas diffusion layers 7, 8 (carbon fabric, felt etc.) are arranged either side of MEA 1 to ensure electrical conduction, uniform distribution of the reactive gases and removal of the water produced. A system of channels 9, 10 located either side of the MEA supplies the reactive gases and removes water and excess gases.

On anode 3, the oxidation of hydrogen on the catalyst produces protons $H^+$ and electrons $e^-$. The protons then pass through polymer membrane 2 before reacting with the oxygen on cathode 4. The reaction of the protons with oxygen on the cathode results in the formation of water and the production of heat.

Extending the service life of PEMCFs is a major issue which affects the use and development of fuel cells for the consumer market. This is why it is now essential to examine and understand the ageing phenomena which affect fuel cell stacks.

The ageing of fuel cells appears to involve several phenomena.

Firstly, numerous scientific studies have demonstrated that the ageing of fuel cells is associated with, among other things, changes in the nanostructure/microstructure properties of the active catalyst layer. Thus, J. P. Meyers and R. M. Darling (*J. Electrochem. Soc.*, 153 (8), A1432, 2006) have reported a marked reduction in the thickness of the active layer on the cathode after several hours of operation (FIG. 2).

This degradation is due to corrosion of the carbon catalyst support caused by the following reaction:

$$C+2H_2O \leftrightarrows CO_2+4H^++4e^- \quad (2)$$

The same authors have demonstrated that this degradation is worsened if the fuel cell is subjected to power cycles.

The potential of this reaction (1) is approximately 0.2 V/ENH. Given that the cathodic potential of a fuel cell generally exceeds 0.2 V, this reaction always takes place.

Ideally, the operation of a PEMFC is characterised by the presence of hydrogen which is used as a fuel on anode 3 and air/oxygen which constitutes the oxidant, on cathode 4. These gas exchanges are shown in FIG. 3.

In reality, membrane 2 is not totally impermeable to the gases during operation of a PEMFC. Consequently, a portion of the oxygen moves from cathode 4 to anode 3. This phenomenon is generally referred to as "crossover". Obviously, the use of fine membranes accentuates this phenomenon.

The oxygen which is present on anode 3 is normally reduced by the hydrogen in the anode compartment. However, during shutdown/start-up phases, power cycles and during water slugging and when the hydrogen supply is switched off, the hydrogen is not sufficient to reach the oxygen. During these phases the oxygen which is still present makes use of other sources of protons, in particular, protons produced by oxidising the cathodic carbon. The oxygen which is present on anode 3 therefore acts as a proton pump which accentuates corrosion of the carbon at the level of cathodic catalyst layer 4 and the reaction (1) is therefore strongly shifted to the right (cf. FIG. 4):

$$C+2H_2O \leftrightarrows CO_2+4H^++4e^- \quad (2)$$

Moreover, damage to the carbon support on the cathode causes a loss of catalyst surface area and an increase in the contact resistance between cathode 4 and gas diffusion layer 8. This is one of the factors which causes reduced durability of PEMCFs.

One proposed solution to stop the corrosion of carbon on the cathode involves introducing carbon dioxide ($CO_2$) in the air on cathode 4 and monitoring the quantity of $CO_2$. This technical solution is described in document JP 2006-278190 and is illustrated in FIG. 5. Introducing $CO_2$ shifts reaction (1) to the left and the consumption/corrosion of carbon is therefore slowed down:

$$C+2H_2O \leftrightarrows CO_2+4H^++4e^- \quad (3)$$

Alternative approaches to overcoming the problem of carbon corrosion on the cathode have been proposed. They involve, in particular, using more resistant carbon supports such as those described, for example, in the document by T. R. Ralph et al. (*ECS Transactions* 1 (8) 2006, 67-84).

It should be noted that all these solutions concentrate on interventions on the cathode only.

Other studies have revealed that the ageing of fuel cells is associated with degradation of the proton conductive electrolyte which is largely present in membrane 2 and in active catalyst layer 3, 4 (Schmittinger and Vahidi, *J. Power Sources*, 180, pp 1-14, 2008).

Thus, as shown in FIG. 6, it has been established, in particular, that the formation of hydrogen peroxide $H_2O_2$ and hydroperoxyl radicals within the cell is one of the main causes of electrolyte degradation (Ohma et al., *J. Power Sources*, 182, pp 39-47, 2008; Mittal et al., *J. of The Electrochemical Society*, 154(7), B652, 2007). Nevertheless, other chemical reactions can also degrade these polymers.

These compounds are produced by the following reactions which take place on the surface of the anodic catalyst:

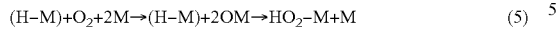

M represents a site on the catalyst.

Equation (4) corresponds to the first stage of the hydrogen oxidation reaction on the anode. This hydrogen adsorption reaction takes place even in the absence of an electric current.

Equation (5) corresponds to reaction of the adsorbed hydrogen with oxygen originating, in particular, from the cathode due to crossover through the membrane in order to form the hydroperoxyl radical adsorbed on catalyst M. This oxygen crossover is at its highest when the fuel cell is open-circuited, the production of hydrogen peroxide is accentuated and ageing is particularly significant under these conditions.

Equation (6) represents the formation of hydrogen peroxide $H_2O_2$ due to the reaction of adsorbed $HO_2$ and H.

To sum up, degradation of the membrane and/or ionomer present in the electrodes is caused in particular by the hydrogen peroxide produced on anode 3 due to a chemical reaction at local sites (M) between anodic hydrogen and a portion of the oxygen originating from the cathode due to crossover. Another portion of the oxygen does not react with the hydrogen but causes an anodic oxygen reduction reaction which accelerates the proton pump effect and corrosion of the cathodic carbon as described above.

In practice and in such a case, the hydrogen peroxide attacks the carbon chains and chemical sites which allow the conduction of protons and which are present, for instance, in Hyflon® Ion/Dow (short-chain polymers) or Nafion® (long-chain polymers), the structures whereof are represented below:

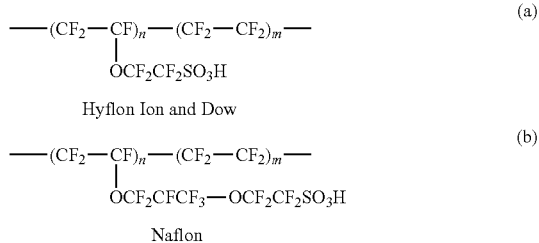

Hommura et al. (*J. Electrochem. Soc.*, 155 (1), A29-A33, 2008) and Curtin et al. (*J. Power Sources*, 131 (½), pp 41-48, 2004) have reported reactions which illustrate the reactivity of a proton conductive polymer with hydrogen peroxide:

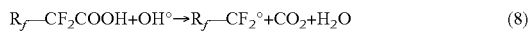

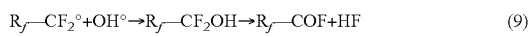

$R_f$ represents the chemical composition of the polymer matrix.

Solutions to limit degradation of the actual membrane itself have already been suggested, these include:

Incorporating metallic oxide micro particles inside the membrane and/or electrodes, e.g. particles in the group consisting of alumina, titanium dioxide, zirconium oxide, germanium, cerium or any combination of these materials that ensures decomposition of the $H_2O_2$ (WO 2007/108949);

Developing composite membranes with enhanced mechanical properties and chemical stability (see, for example, WO 2005/045976).

Nevertheless, there still remains a need to develop technical solutions which make it possible to limit the ageing of PEMFC type fuel cells.

SUMMARY OF THE INVENTION

The Applicant has approached the technical problem in question inventively from a completely different direction and suggests resolving the problem by acting on the anode.

Thus, the invention is based on adding, at the anode, a chemical compound which is not hydrogen but which is capable of reacting with the oxygen which is present at the anode.

More precisely, it involves supplying an exogenous compound whose only function is to "trap" the oxygen. Advantageously, it involves a gas which is injected deliberately in a controlled manner at the level of the anode in order to ensure the sought-after function, namely to protect the fuel cell against ageing.

It is clear that this involves a compound which does not originate from the fuel. In particular, it does not involve any impurities which are present in the fuel which generally consists of hydrogen.

Generally speaking, the present invention therefore relates to a method for extending the lifetime of a PEMFC fuel cell that includes the step of supplying, at the anode, a chemical compound capable of reacting with oxygen.

As stated above, the protection against ageing is based on two parallel mechanisms:

The consumption, or even elimination, of oxygen at the anode makes it possible to limit, or even stop, the demand for protons originating from the cathode due to corrosion of the carbon in its catalyst layer, the carbon being in the form, for example, of carbon black or nano tubes. Corrosion of the cathodic carbon is thus limited and the lifetime of the fuel cell is extended. More precisely, the invention relates to a method for providing protection against corrosion of the cathode of a PEMFC fuel cell that includes the step of supplying, at the anode, a chemical compound capable of reacting with oxygen.

As stated earlier, the present invention really makes sense if the fuel cell comprises a carbon-based catalyst layer on the cathode, advantageously in the form of carbon black, which undergoes corrosion and releases protons that react with the oxygen from the anode.

According to one preferred embodiment and given the gas exchanges which take place inside fuel cells, the chemical compound supplied is in a gaseous state.

Said compound must have the essential property of reacting with oxygen and thus consuming oxygen which is present at the anode.

Advantageously, the gas chosen is either carbon monoxide (CO) or carbon dioxide ($CO_2$).

The fact that this reagent is in gaseous form makes it possible to incorporate it in the flow of hydrogen gas to the anode.

Adding CO to the hydrogen makes it possible to reduce the quantity of oxygen that is present at the anode in accordance with the following mechanism:

$$O_2 + 2M \rightarrow 2(O-M) \quad (11)$$

$$CO + M \rightarrow (CO-M) \quad (12)$$

$$(CO-M) + (O-M) \rightarrow CO_2 + 2M \quad (13)$$

$$(O-M) + 2(H-M) \rightarrow H_2O + 3M \quad (14)$$

where M denotes a site on the anodic catalyst.
- equation (11) corresponds to the first step in the reaction to reduce the anodic oxygen,
- equation (12) corresponds to adsorption of CO on the catalyst,
- equation (13) corresponds to the reaction to eliminate the adsorbed oxygen,
- and equation (14) represents elimination of the remaining oxygen by monoatomic hydrogen obtained from the anodic hydrogen oxidation mechanism (Franco, P. Schott et al., *Journal of the Electrochemical Society*, 153 (6) A1 053 (2006)).

The quantity of CO supplied must be sufficient to reduce the anodic oxygen but small enough to avoid excessive poisoning of the catalyst and hence an irreversible drop in the voltage of the fuel cell.

If the voltage of the fuel cell is very high, it is possible to supply a significant quantity of CO in the hydrogen because its impact in terms of poisoning is slight. For initial voltages in excess of 800 mV (which corresponds, in particular, to an open-circuited fuel cell), it is possible to supply several hundred ppm of CO.

Generally speaking, the quantity of CO required must not exceed twice the quantity of oxygen that passes through the membrane. This quantity of oxygen can be measured experimentally and depends on many factors, especially the nature of the membrane, its thickness, water content and temperature etc.

Note that, in the long term, adding CO to the anode has less impact in terms of degraded performance than corrosion of cathodic carbon caused by the proton pump and poisoning by CO is only predominant in the short term.

A second highly suitable alternative involves adding $CO_2$ to the hydrogen.

In this case, the $CO_2$ reacts with the hydrogen adsorbed on the anodic catalyst and forms CO which is adsorbed in accordance with the following reaction:

$$CO_2 + 2(H-M) \rightarrow (CO-M) + H_2O + M \quad (15)$$

The adsorbed CO will then react with the oxygen in accordance with the mechanism described above.

According to the invention, the anodic catalyst must be compatible with the supplied chemical compound.

Thus, and according to one preferred embodiment, the analytic catalyst tolerates carbon monoxide, as platinum does. In fact, the chemical compound must not react with the catalyst and block its active sites because this would limit the electrochemical reaction, especially the oxidation of hydrogen. Said anodic catalyst is advantageously a bimetallic catalyst, especially an alloy of platinum, for example Pt—Sn, Pt—Ru or Pt—Mo, or a trimetallic catalyst such as Pt—Ru—Mo. It is also possible to use other catalysts such as tungsten carbide (CW).

According to a second aspect, the invention relates to a method for providing protection against so-called chemical degradation, especially that caused by hydrogen peroxide ($H_2O_2$), of the proton conductive polymer of a PEMFC fuel cell that includes the step of supplying, at the anode, a chemical compound capable of reacting with oxygen.

Equation (5) described above clearly shows that elimination of oxygen by supplying the chemical compound at the anode prevents it reacting with the hydrogen and thus prevents the formation of hydrogen peroxide. Degradation of the proton conductor is limited in this way.

According to this aspect of the invention, the proton conductive polymer is located in the electrolyte membrane and in the catalyst layers. This therefore results in protection against degradation of the membrane and/or the catalyst layers of the fuel cell.

The technical solution is identical to that described above which has the effect of protecting a carbon-based cathode against corrosion.

The reactions involved, in the presence, in particular, of carbon monoxide (CO) or carbon dioxide ($CO_2$), are those described in equations (11) to (14) and (15) respectively.

Note that the principle of supplying the anode using gases other than hydrogen has already been described. This is the case, for example, with oxygen which is used to eliminate, by oxidation, impurities, especially carbon monoxide CO, that is present at the anode and capable of poisoning the anodic catalyst.

This situation is shown in FIG. 8 and clearly differs from the present invention because it involves solving a problem at the level of the anode. In addition, adding oxygen has the reverse effect of accelerating the proton pump and therefore carbon corrosion.

According to another aspect, the invention also relates to a fuel cell equipped with means of supplying, at the anode, an exogenous chemical compound capable of reacting with oxygen. Advantageously, the fuel cell has the following additional technical characteristics:
- it has a cathodic catalyst which contains carbon;
- the chemical compound is advantageously a gas, preferably carbon monoxide or carbon dioxide. On the other hand, it is neither hydrogen nor oxygen. It also does not involve impurities originating from the fuel, such as CO or $CO_2$ which may contaminate the hydrogen, for example;
- the fuel cell is equipped with devices for monitoring the flow rate of the supply means. Thus, the anode is supplied in a quantity which is advantageously equal to or less than twice the quantity of oxygen that passes through the membrane of the cathode towards the anode;
- the anode comprises a platinum-based catalyst and/or the anodic catalyst is bimetallic, especially an alloy of platinum, for instance Pt—Sn, Pt—Ru or Pt—Mo.
- the membrane and/or catalyst layers comprise a proton conductive polymer which is capable of being degraded, especially by hydrogen peroxide ($H_2O_2$).

According to one preferred embodiment, the supply means takes the form of a channel. It can be the same channel as that which supplies the anode with fuel, advantageously hydrogen.

BRIEF DESCRIPTION OF THE DRAWINGS

The way in which the invention may be implemented and its resulting advantages will be made more readily understandable by the description of the following embodiment, given merely by way of example, reference being made to the accompanying drawings.

EMBODIMENTS OF THE INVENTION

A fuel cell consisting of MEA 1 having an active surface area (Pt catalyst) of 2 cm² supplied with pure hydrogen and oxygen which operates at 1.5 bar at the anode ($H_2$) and at 80° C. and 100% RH at the cathode ($O_2$).

An on (45 minutes)/off (15 minutes) load cycle is adopted.

When the concentration of oxygen at anode 3, due to crossover, is of the order of 1 ppm, it has been found that up to 50% of cathodic carbon support 4 can be lost after roughly 1000 hours of operation.

Figure 1:
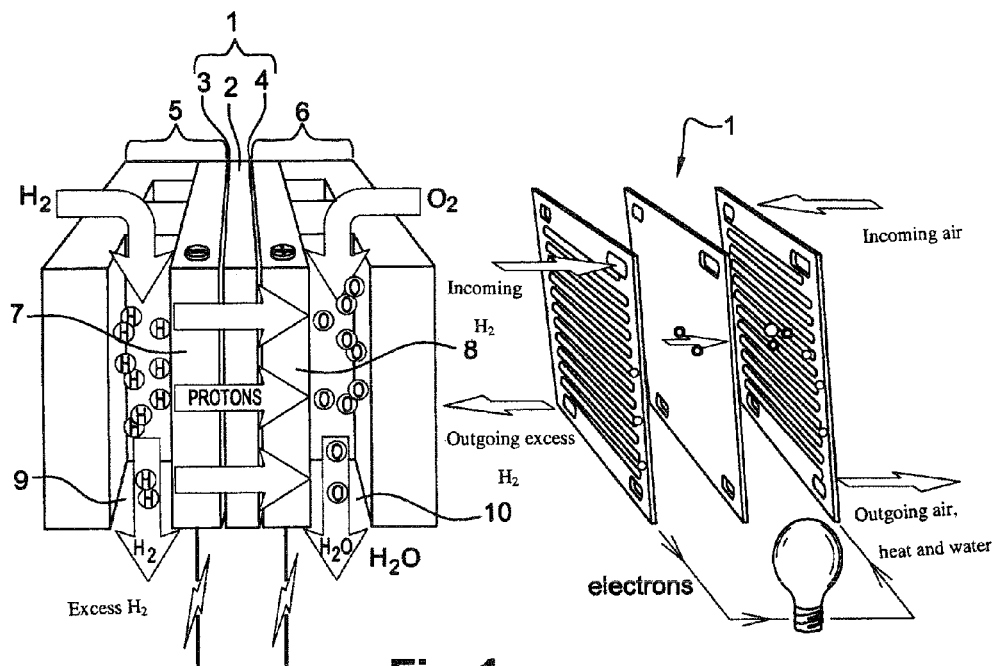
FIG. 1 is a schematic diagram showing the operating principle of a PEMFC type fuel cell.
Figure 2:
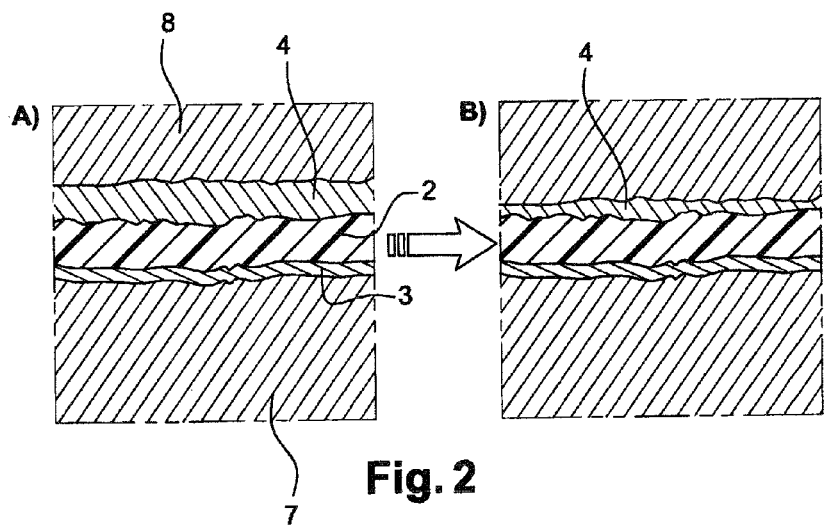
FIG. 2 compares a cross-section through an MEA, observed under a microscope, before use (A) and after several operating cycles (B).
Figure 3:
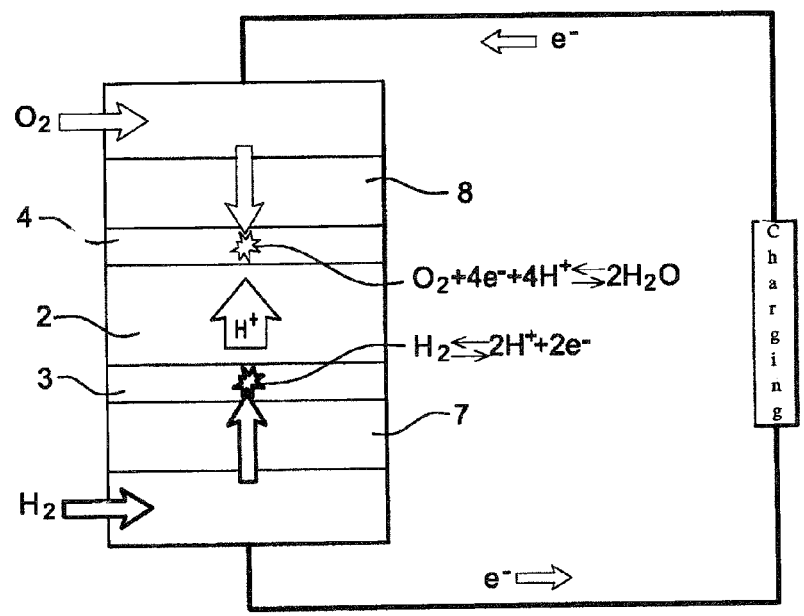
FIG. 3 schematically shows the ideal operation of a PEMFC.
Figure 4:
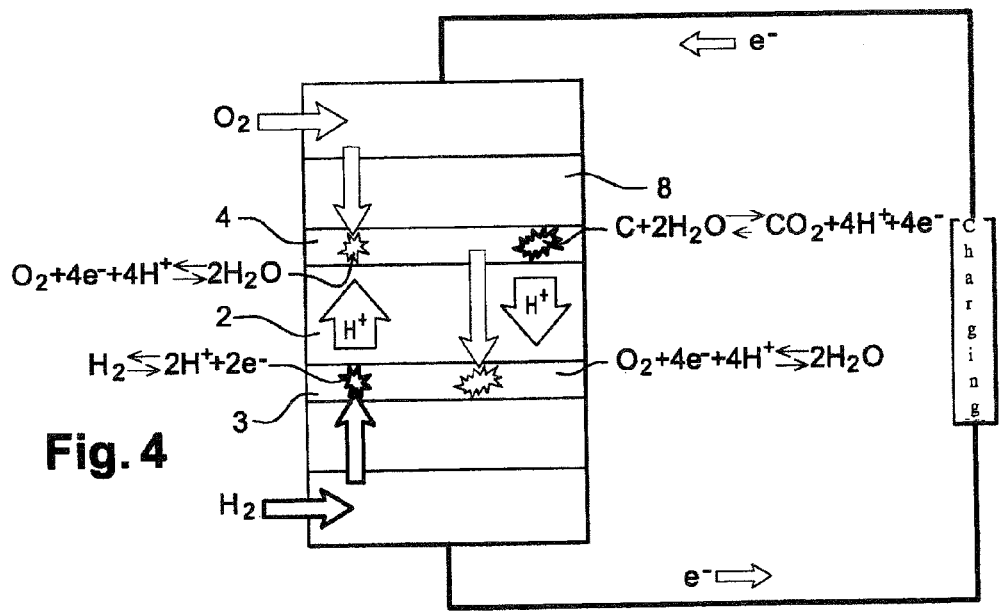
FIG. 4 schematically shows the real operation of a PEMFC; this entails the cathode being degraded by carbon corrosion.
Figure 5:
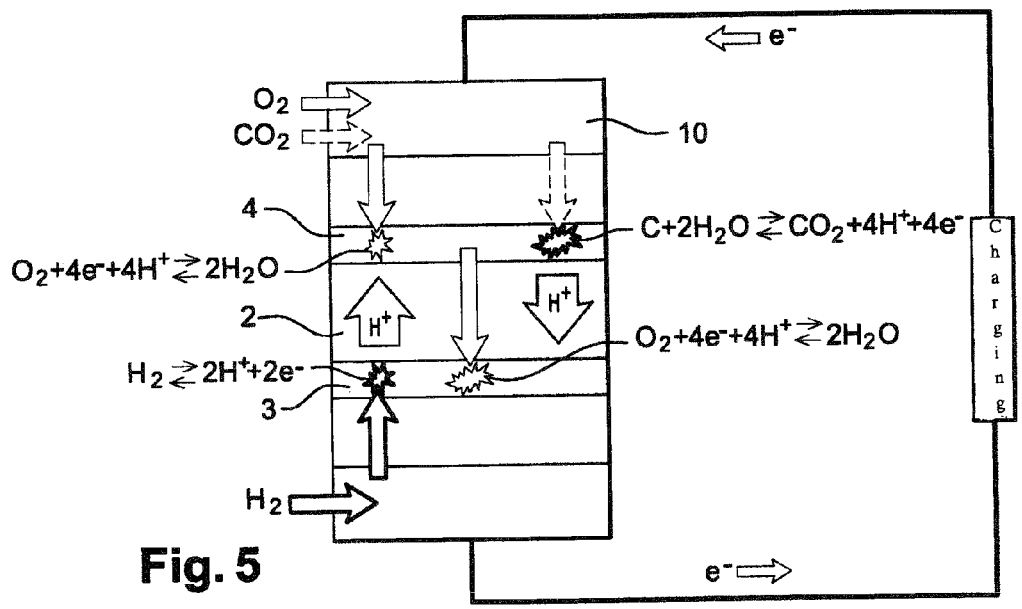
FIG. 5 shows the principle of adding $CO_2$ at the cathode in order to prevent corrosion of the carbon on that electrode, according to the prior art.
Figure 6:
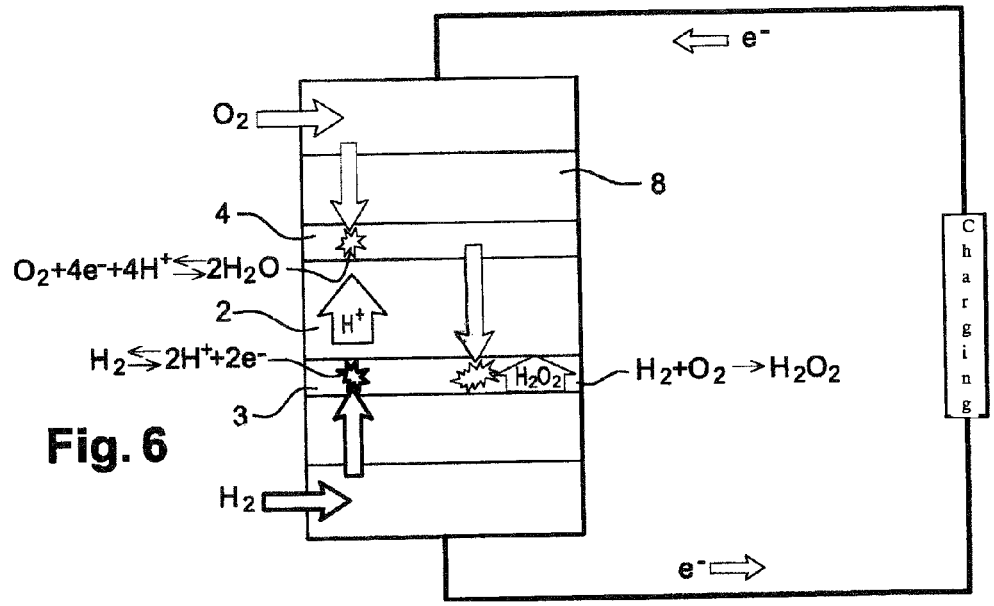
FIG. 6 schematically shows the real operation of a PEMFC; this entails the production of hydrogen peroxide $H_2O_2$ and hydroperoxyl radicals which are particular causes of deterioration of proton conductors.
Figure 7A:
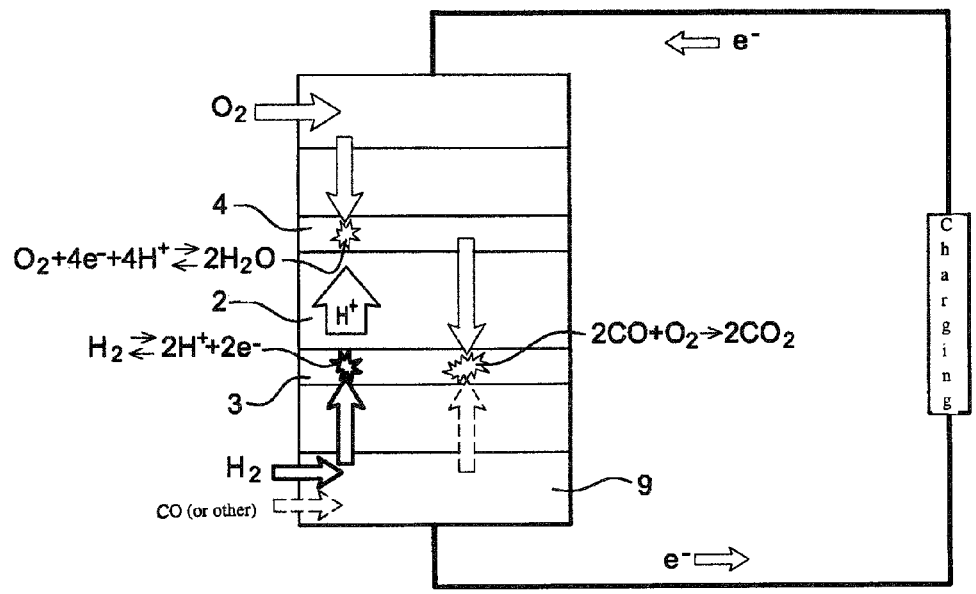
FIG. 7 shows the principle of the present invention which involves adding CO at the anode in order to prevent carbon corrosion on cathode (A) and in order to prevent degradation of electrolyte (B), especially that caused by hydrogen peroxide $H_2O_2$ and by hydroperoxyl radicals.
Figure 7B:
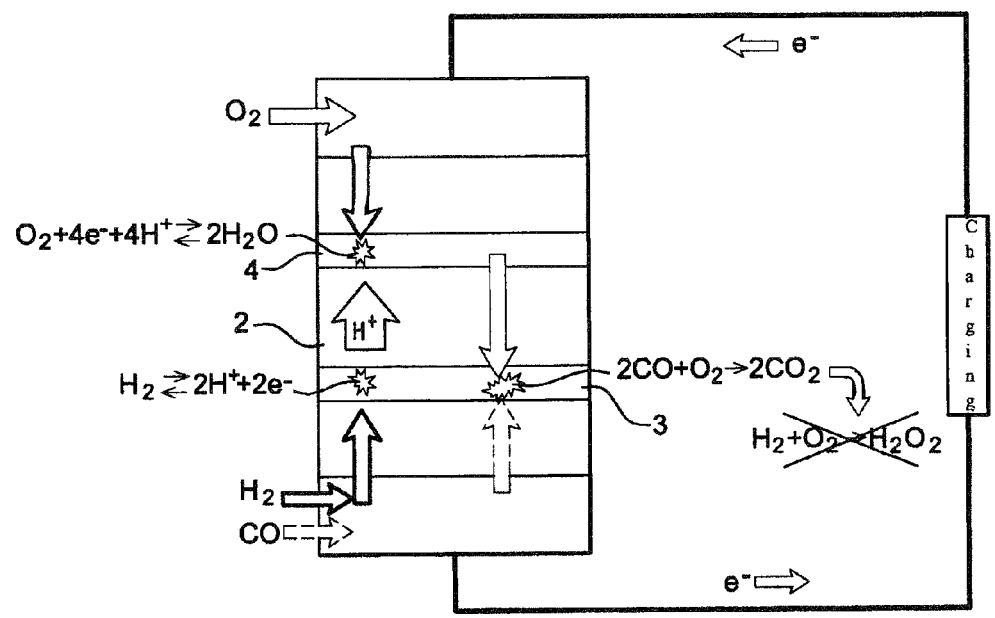
Figure 8:
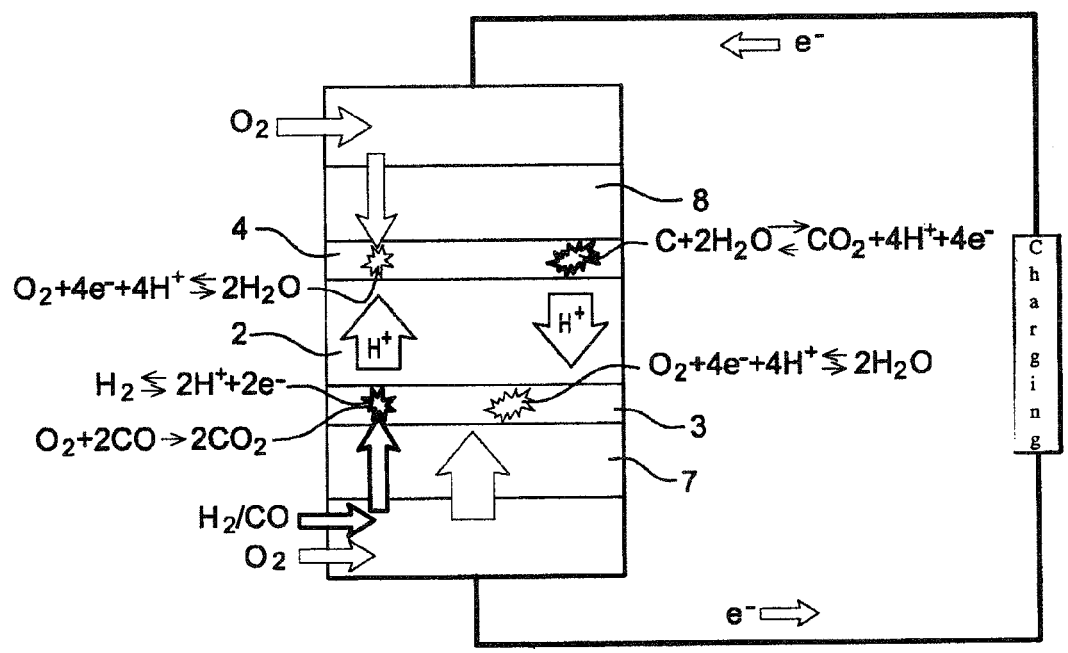
FIG. 8 shows the principle of adding $O_2$ at the anode in order to eliminate CO from the hydrogen in accordance with the prior art.

Under these conditions, approximately 2 ppm of CO was supplied at anode 3 via channels 9 which make it possible to feed in hydrogen. The gas exchanges and reactions which take place under these conditions inside the PEMFC fuel cell are shown in FIG. 7A.

Measurements reveal that the corrosion of cathodic carbon 4 and degradation of proton conductors (2, 3, 4) were thus limited.

Firstly, the mass of carbon lost is reduced to approximately 30% after 1000 hours of operation. Secondly, x-ray photoelectron spectroscopy (XPS) analyses show that, after 1000 hours of operation, the structure of the proton conductor is less degraded if CO is present than in pure hydrogen.

The invention claimed is:

1. A method of operating a fuel cell, the fuel cell comprising a proton conductive polymer membrane including an anode catalyst layer and a cathode catalyst layer, the membrane separating an anode compartment and a cathode compartment of the fuel cell, the method comprising the steps of:
   supplying a fuel to the anode compartment and an oxidant to the cathode compartment to generate a voltage; and
   deliberately supplying a gas to the anode compartment, other than hydrogen, in an amount effective to react with a quantity of oxygen that passes through the membrane from the cathode compartment towards the anode compartment, the gas not originating from the fuel.

2. The method according to claim 1, wherein the cathode catalyst layer comprises carbon.

3. The method according to claim 2, wherein the cathode catalyst layer comprises carbon black.

4. The method according to claim 1, wherein at least one of the membrane, the anode catalyst layer, and the cathode catalyst layer comprise a proton conductive polymer capable of being chemically degraded.

5. The method according to claim 4, wherein the proton conductive polymer is capable of being chemically degraded by hydrogen peroxide.

6. The method according to claim 1, wherein the gas supplied to the anode compartment is selected from the group consisting of carbon monoxide and carbon dioxide.

7. The method according to claim 6, wherein the amount of gas supplied to the anode compartment does not cause an irreversible drop in the voltage of the fuel cell.

8. The method according to claim 6, wherein the amount of gas supplied to the anode compartment during an open-circuit condition is up to 200 parts per million.

9. The method according to claim 1, wherein the amount of gas supplied to the anode compartment is equal to or less than twice the quantity of oxygen determined to pass through the membrane.

10. The method according to claim 1, further comprising the step of determining the quantity of oxygen that passes through the proton exchange membrane.

11. The method according to claim 10, wherein the quantity of oxygen that passes through the proton exchange membrane is measured experimentally.

12. The method according to claim 1, wherein the anode catalyst layer comprises a platinum-based catalyst.

13. The method according to claim 12, wherein the catalyst is selected from the group consisting of Pt—Sn, Pt—Ru, and Pt—Mo.

14. The method according to claim 1, wherein the method extends the lifetime of the fuel cell.

15. The method according to claim 1, wherein the method provides protection against carbon corrosion of the cathode catalyst layer.

16. The method according to claim 1, wherein the method provides protection against degradation of the membrane and/or catalyst layers.

17. A fuel cell system, comprising:
   an anode compartment operable to supply a fuel;
   a cathode compartment operable to supply an oxidant;
   a proton conductive polymer membrane separating the anode compartment and the cathode compartment, the membrane including an anode catalyst layer and a cathode catalyst layer; and
   a gas supply for deliberately supplying a gas other than hydrogen to the anode compartment in an amount effective to react with a quantity of oxygen that passes through the membrane from the cathode compartment towards the anode compartment, the gas not originating from the fuel.

18. The fuel cell system according to claim 17, wherein the cathode catalyst layer comprises carbon.

19. The fuel cell system according to claim 18, wherein the cathode catalyst layer comprises carbon black.

20. The fuel cell system according to claim 17, wherein at least one of the membrane, the anode catalyst layer, and the cathode catalyst layer comprise a proton conductive polymer capable of being chemically degraded.

21. The fuel cell system according to claim 17, further comprising a device to monitor the quantity of gas supplied to the anode compartment, the quantity of gas being equal to or less than twice the quantity of oxygen that passes through the membrane.

22. The fuel cell system according to claim 17, wherein the anode catalyst layer comprises a platinum-based catalyst.

23. The fuel cell system according to claim 22, wherein the catalyst is selected from the group consisting of Pt—Sn, Pt—Ru and Pt—Mo.

24. The fuel cell system according to claim 17, wherein the gas supplied to the anode compartment is selected from the group consisting of carbon monoxide and carbon dioxide.

* * * * *